(12) United States Patent
Suciu et al.

(10) Patent No.: US 7,937,927 B2
(45) Date of Patent: May 10, 2011

(54) COUNTER-ROTATING GEARBOX FOR TIP TURBINE ENGINE

(75) Inventors: Gabriel Suciu, Glastonbury, CT (US); Brian Merry, Andover, CT (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1030 days.

(21) Appl. No.: 11/719,224

(22) PCT Filed: Dec. 1, 2004

(86) PCT No.: PCT/US2004/039961
§ 371 (c)(1),
(2), (4) Date: May 14, 2007

(87) PCT Pub. No.: WO2006/059968
PCT Pub. Date: Jun. 8, 2006

(65) Prior Publication Data
US 2009/0071121 A1    Mar. 19, 2009

(51) Int. Cl.
*F02C 1/06* (2006.01)
(52) U.S. Cl. .................... 60/39.162; 60/268
(58) Field of Classification Search ........... 60/39.162, 60/226.1, 268, 791, 792
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |

(Continued)

FOREIGN PATENT DOCUMENTS

DE    767704    5/1953

(Continued)

*Primary Examiner* — Michael Cuff
*Assistant Examiner* — Phutthiwat Wongwian
(74) *Attorney, Agent, or Firm* — Carlson, Gaskey & Olds, P.C.

(57) ABSTRACT

A tip turbine engine (10) provides an axial compressor rotor (46) that is counter-rotated relative to a fan (24). A planetary gearset (90) couples rotation of a fan (46) to an axial compressor rotor (46), such that the axial compressor rotor (46) is driven by rotation of the fan in a rotational direction opposite that of the fan. By counter-rotating the axial compressor rotor, a final stage of compressor vanes (54) between the final stage of compressor blades (52) and inlets (66) to the hollow fan blades (28) of the fan are eliminated. As a result, the length of the axial compressor (22) and the overall length of the tip turbine engine (10) are decreased.

15 Claims, 4 Drawing Sheets

U.S. PATENT DOCUMENTS

| | | | |
|---|---|---|---|
| 3,216,455 A | 11/1965 | Cornell et al. | |
| 3,267,667 A | 8/1966 | Erwin | |
| 3,269,120 A | 8/1966 | Sabatiuk | |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A * | 6/1988 | Perry | 60/226.1 |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,969,325 A * | 11/1990 | Adamson et al. | 60/226.1 |
| 4,999,994 A | 3/1991 | Rud et al. | |
| 5,010,729 A * | 4/1991 | Adamson et al. | 60/226.1 |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A * | 11/1995 | McKibbin et al. | 475/346 |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,158,210 A * | 12/2000 | Orlando | 60/226.1 |
| 6,223,616 B1 | 5/2001 | Sheridan | |
| 6,244,539 B1 | 6/2001 | Lifson et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 7,021,042 B2 | 4/2006 | Law | |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 * | 2/2004 | Paul | 60/39.43 |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |
| GB | 2026102 | 1/1980 |
| GB | 2095755 | 10/1982 |
| GB | 2191606 | 12/1987 |
| GB | 2229230 | 9/1990 |
| GB | 2265221 | 9/1993 |
| GB | 2401655 | 11/2004 |
| GB | 2410530 | 8/2005 |
| JP | 10184305 | 7/1998 |
| WO | 9902864 | 1/1999 |
| WO | 0127534 | 4/2001 |
| WO | 02081883 | 10/2002 |
| WO | 2004011788 | 2/2004 |
| WO | 2004022948 | 3/2004 |
| WO | 2004092567 | 10/2004 |
| WO | 2006/059968 | 6/2006 |
| WO | 2006/059969 | 6/2006 |
| WO | 2006/059972 | 6/2006 |

| | | | | | | |
|---|---|---|---|---|---|---|
| WO | 2006/059973 | 6/2006 | | WO | 2006/060002 | 6/2006 |
| WO | 2006/059974 | 6/2006 | | WO | 2006/060003 | 6/2006 |
| WO | 2006/059975 | 6/2006 | | WO | 2006/060004 | 6/2006 |
| WO | 2006/059976 | 6/2006 | | WO | 2006/060005 | 6/2006 |
| WO | 2006/059977 | 6/2006 | | WO | 2006/060006 | 6/2006 |
| WO | 2006/059978 | 6/2006 | | WO | 2006/060009 | 6/2006 |
| WO | 2006/059979 | 6/2006 | | WO | 2006/060010 | 6/2006 |
| WO | 2006/059980 | 6/2006 | | WO | 2006/060011 | 6/2006 |
| WO | 2006/059981 | 6/2006 | | WO | 2006/060012 | 6/2006 |
| WO | 2006/059982 | 6/2006 | | WO | 2006/060013 | 6/2006 |
| WO | 2006/059985 | 6/2006 | | WO | 2006/060014 | 6/2006 |
| WO | 2006/059986 | 6/2006 | | WO | 2006/062497 | 6/2006 |
| WO | 2006/059987 | 6/2006 | | WO | 2006059980 | 6/2006 |
| WO | 2006/059988 | 6/2006 | | WO | 2006059990 | 6/2006 |
| WO | 2006/059989 | 6/2006 | | WO | 2006060003 | 6/2006 |
| WO | 2006/059990 | 6/2006 | | WO | 2006/059971 | 8/2006 |
| WO | 2006/059991 | 6/2006 | | WO | 2006/059970 | 10/2006 |
| WO | 2006/059992 | 6/2006 | | WO | 2006/110122 | 10/2006 |
| WO | 2006/059993 | 6/2006 | | WO | 2006/110125 | 10/2006 |
| WO | 2006/059994 | 6/2006 | | WO | 2006/059997 | 11/2006 |
| WO | 2006/059995 | 6/2006 | | WO | 2006/110124 | 11/2006 |
| WO | 2006/059996 | 6/2006 | | WO | 2006/110123 | 12/2006 |
| WO | 2006/059999 | 6/2006 | | WO | 2006/112807 | 12/2006 |
| WO | 2006/060000 | 6/2006 | | | | |
| WO | 2006/060001 | 6/2006 | | | | |

* cited by examiner

COUNTER-ROTATING GEARBOX FOR TIP TURBINE ENGINE

This invention was conceived in performance of U.S. Air Force contract F33657-03-C-2044. The government may have rights in this invention.

BACKGROUND OF THE INVENTION

The present invention relates to a tip turbine engine, and more particularly to a gearbox for counter-rotatably driving an axial compressor of a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines include hollow fan blades that receive core airflow therethrough such that the hollow fan blades operate as a centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In the known tip turbine engine designs, an axial compressor rotor is directly driven by rotation of the hollow fan blades. The axial compressor rotor includes one or more stages of radially-extending compressor blades each of which followed by a stage of static compressor vanes extending radially inwardly from a compressor case. Increasing the number of stages of compressor blades and compressor vanes increases the compression of the core airflow and the efficiency of the engine, but increases the overall length and weight of the engine and the number of parts.

SUMMARY OF THE INVENTION

A tip turbine engine according to the present invention provides at least one gear coupling the rotation of the fan to an axial compressor rotor, such that the axial compressor rotor is driven in a rotational direction opposite that of the fan. In the disclosed embodiment, the at least one gear is an epicyclic gearset, such as planetary gearset. The axial compressor rotor is coupled to a sun gear and the fan is coupled to a planet carrier. The planet carrier carries a plurality of first planet gears engaging the sun gear and a plurality of second planet gears engaging the first planet gears and a ring gear.

In this manner, the direction of rotation of the axial compressor rotor is reversed relative to the direction of rotation of the fan by the planetary gearset. Because the axial compressor blades are rotating in a direction opposite that of the inducer sections of the fan blades, it is unnecessary to redirect the flow of the compressed core airflow prior to the inducer sections. Therefore, a final stage of compressor vanes between the final stage of axial compressor blades and the inducer sections is eliminated, thereby reducing the length of the axial compressor and the overall length of the tip turbine engine. Additionally, the angle of the inducer relative to the engine axis is increased, which thereby shortens the overall axial dimension of the inducer, thereby further reducing the overall length of the engine.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
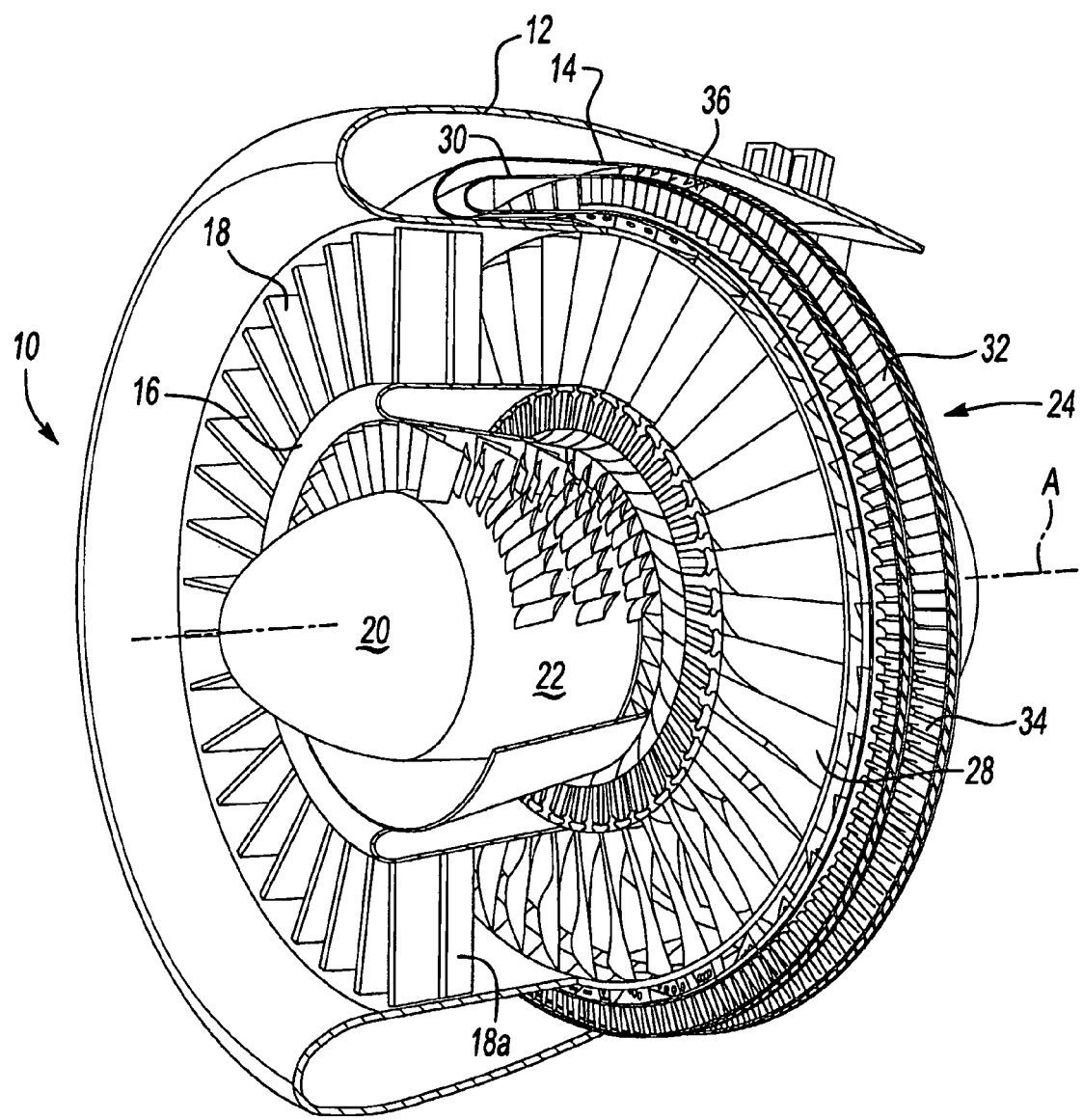
FIG. 1 is a partial sectional perspective view of a tip turbine engine according to the present invention.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
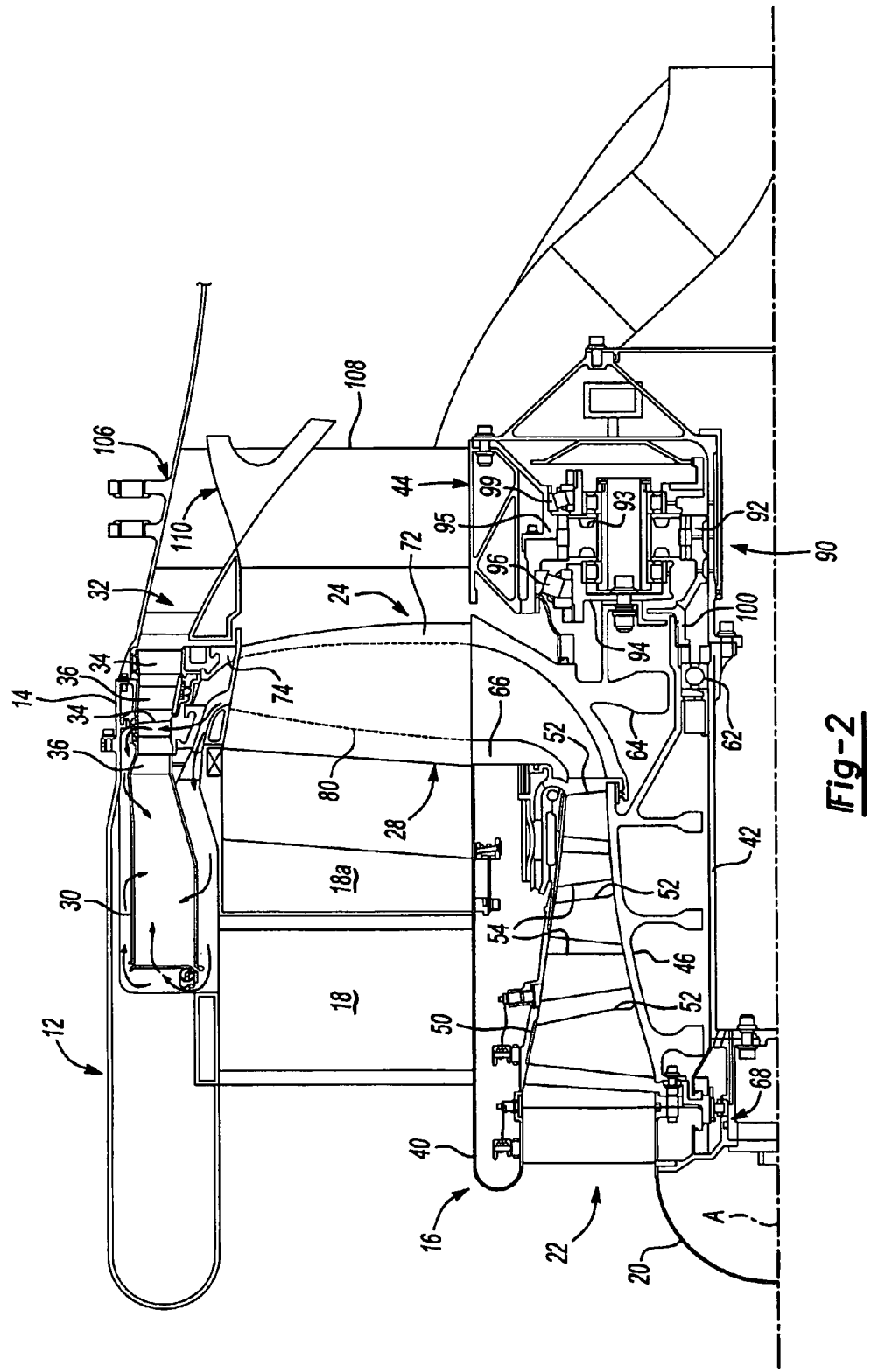
FIG. 2 is a longitudinal sectional view of the tip turbine engine of FIG. 1 taken along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, from which a plurality of compressor blades 52 extend radially outwardly, and a fixed compressor case 50. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and two stages of compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again toward an axial airflow direction toward the annular combustor 30. Preferably, the airflow is diffused axially forward in the engine 10, however, the airflow may alternatively be communicated in another direction.

Figure 3:
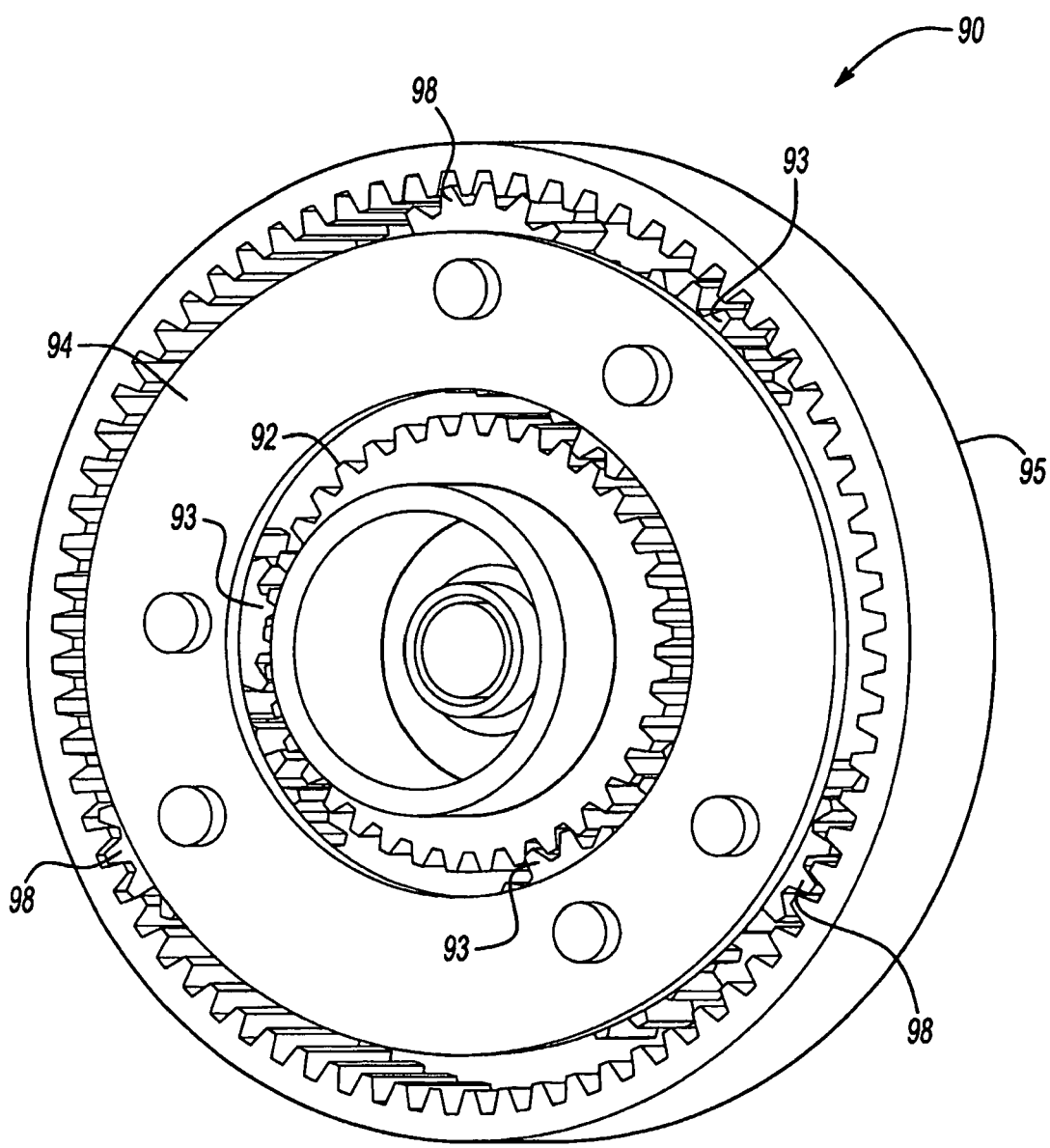
FIG. 3 is a perspective view of the gearbox assembly of FIG. 2.

A gearbox assembly 90 aft of the fan-turbine rotor assembly 24 reverses the direction of rotation and provides a speed increase between the fan-turbine rotor assembly 24 and the axial compressor 22. In the embodiment shown, the speed increase is at a 3.34-to-one ratio. The gearbox assembly 90 may be an epicyclic gearbox, such as a planetary gearbox that provides counter-rotating engagement between the fan-turbine rotor assembly 24 and an axial compressor rotor 46. The gearbox assembly 90 is mounted for rotation between the static inner support housing 42 and the static outer support housing 44. Referring to FIGS. 2 and 3, the gearbox assembly 90 includes a sun gear 92, which rotates the axial compressor 22, and a planet carrier 94, which rotates with the fan-turbine rotor assembly 24. A plurality of first planet gears 93 each engage the sun gear 92 and one of a plurality of second planet gears 98 (visible only in FIG. 3). The second planet gears 98 each engage one of the first planet gears and a rotationally fixed ring gear 95. The first planet gears 93 and second planet gears 98 are mounted to the planet carrier 94. The gearbox assembly 90 is mounted for rotation between the sun gear 92 and the static outer support housing 44 through a gearbox forward bearing 96 and a gearbox rear bearing 99. The sun gear 92 is rotationally engaged with the axial compressor rotor 46 at a splined interconnection 100 or the like.

It should be noted that the gearbox assembly 90 could utilize other types of gear arrangements or other gear ratios and that the gearbox assembly 90 could be located at locations other than aft of the axial compressor 22. For example, the gearbox assembly 90 could be located at the front end of the axial compressor 22. Alternatively, the gearbox assembly 90 could provide a speed decrease between the fan-turbine rotor assembly 24 and the axial compressor rotor 46.

Figure 4:
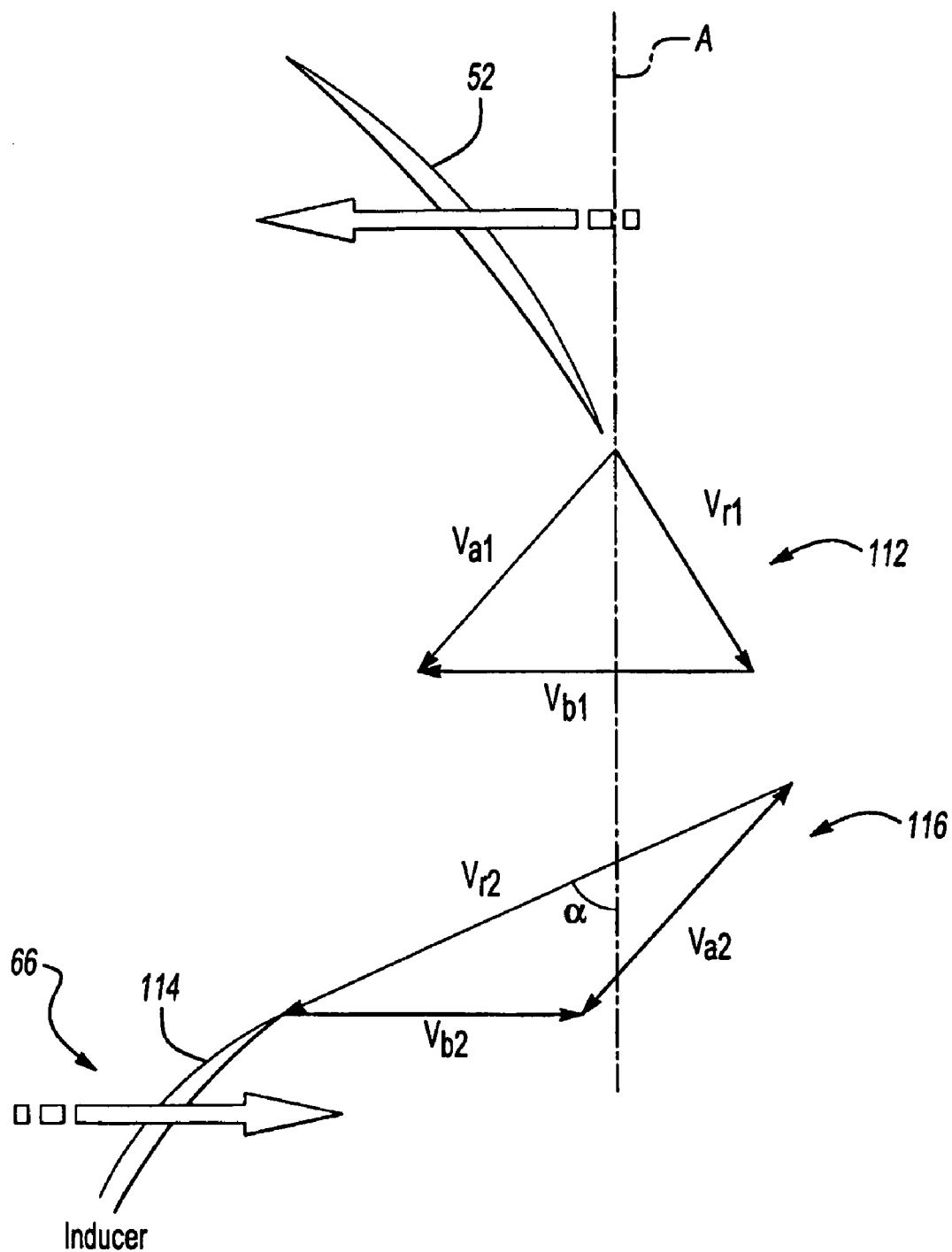
FIG. 4 illustrates the relationship of the angles of the last stage of compressor blades and the inducer sections in the counter-rotating axial compressor rotor of FIG. 2.

FIG. 4 illustrates the relationship of the angle of the compressor blades 52 (one shown) in the last stage of counter-rotating compressor blades 52 to the inducer sections 66 in the engine 10 of FIG. 2. As indicated above, the counter-rotation of the compressor blades 52 permits the final stage of compressor blades 52 to be positioned immediately adjacent the inducer sections 66, thereby eliminating an otherwise-necessary intervening stage of compressor vanes 54 (FIG. 2).

Referring to the compressor blade velocity triangle 112 in FIG. 4, the compressor blade 52 is angled relative to the engine centerline A, which gives an angle of a relative velocity vector, $v_{r1}$. The velocity of the counter-rotating compressor blade 52 gives a blade velocity vector, $v_{b1}$. The resultant vector, indicating the resultant core airflow from the compressor blade 52, is the absolute velocity vector, $v_{a1}$. The leading edge 114 of the inducer section 66 is angled to efficiently receive the core airflow from the compressor blade 52, which flows toward the inducer section 66 at the absolute velocity vector, $v_{a1}$. The absolute velocity vector, $v_{a1}$, is reproduced as absolute velocity vector, $v_{a2}$ in the inducer velocity triangle 116. Since the inducer section 66 is moving as shown by blade velocity vector $v_{a2}$, the leading edge 114 is angled parallel to a relative velocity vector $v_{r2}$, which together with blade velocity vector $v_{b2}$ would result in absolute velocity vector, $v_{a2}$, to match the angle of the core airflow incoming from the compressor blade 52.

Although the specific angles will depend on a variety of factors, including anticipated blade velocities and the design choices made in the earlier stages of the compressor blades 52, two general benefits are provided by counter-rotation. First, there is no need for a non-rotating stage of compressor vanes between the last stage of compressor blades 52 and the inducer sections 66, since compression is provided by the counter-rotation of the compressor blades 52 and inducer sections 66 which would not be provided by adjacent, co-rotating components. This reduces the overall length and weight of the engine 10 and the number of parts in the engine 10. Second, the absolute velocity vector $v_{a2}$ of the core airflow into the inducer sections 66 has a component that is opposite the blade velocity vector $v_{b2}$, which would not exist in a co-rotating arrangement with a compressor vane between the compressor blades 52 and the inducer section 66. As a result, the angle $\alpha$ of the leading edge 114 of the inducer section 66 relative the engine centerline A is significantly increased, thereby shortening the axial length of the inducer (since it requires a certain absolute length, in order to turn the core airflow from axial flow to radial flow), and decreasing the overall length of the engine 10.

In operation, core airflow enters the axial compressor 22, where it is compressed by the compressor blades 52. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn counter-rotatably drives the axial compressor 22 via the gearbox assembly 90. As explained above, counter-rotation of the axial compressor 22 permits elimination of a stage of compressor vanes. As a result, the length of the axial compressor 22 and the overall length of the tip turbine engine 10 are decreased.

The fan-turbine rotor assembly 24 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
   a fan rotatable about an axis, the fan including a plurality of fan blades;
   a turbine having a plurality of turbine blades mounted at outer ends of the fan blades, the turbine rotatably driving the fan; and
   an axial compressor rotor including at least one set of compressor blades, the axial compressor rotor driven in a rotational direction opposite that of the fan, wherein at least one gear couples the axial compressor rotor to the fan such that the axial compressor rotor is counter-rotatably driven by the fan.

2. The turbine engine of claim 1 wherein the at least one set of compressor blades of the axial compressor rotor includes a plurality of axially-spaced sets of compressor blades, each of the plurality of axially-spaced sets of compressor blades driven counter-rotationally by the rotation of the fan via the at least one gear.

3. The turbine engine of claim 1 wherein the at least one gear includes a sun gear and at least one planet gear.

4. The turbine engine of claim 3 wherein the at least one planet gear includes a first planet gear coupled to the sun gear and a second planet gear coupled to the first planet gear.

5. The turbine engine of claim 4 wherein the axial compressor rotor is coupled to the sun gear.

6. The turbine engine of claim 5 wherein the at least one gear further includes a planet carrier carrying the second planet gear, the planet carrier coupled to the fan.

7. The turbine engine of claim 1, wherein at least one of the fan blades includes a compressor chamber extending radially therein and an inlet leading toward the compressor chamber, the compressor chamber and the inlet rotatable with the fan, the compressor chamber leading toward a combustor which generates a high-energy gas stream to drive the turbine, the axial compressor rotor compressing core airflow leading to the compressor chamber, the at least one set of compressor blades including a final stage of compressor blades immediately adjacent the inlet to the compressor chamber with no intervening compressor vanes.

8. A turbine engine comprising:
   a fan rotatable about an axis, the fan including a plurality of fan blades;
   a turbine having at least one turbine blade mounted at outer ends of the fan blades;
   a planetary gearset including a sun gear, a first planet gear, a second planet gear, a planet carrier and a ring gear;
   the sun gear engaging the first planet gear, the first planet gear engaging the second planet gear, at least one of the first planet gear and the second planet gear being carried by the planet carrier, the second planet gear engaging the ring gear; and
   an axial compressor rotor having a plurality of compressor blades extending radially, the planetary gearset coupling the fan to the axial compressor rotor such that the axial compressor rotor is counter-rotationally driven by the fan.

9. The turbine engine of claim 8 wherein at least one fan blade of the plurality of fan blades defines a compressor chamber extending radially therein.

10. The turbine engine of claim 9 further including at least one combustor receiving core airflow from the compressor chamber, the at least one turbine mounted aft of the at least one combustor.

11. The turbine engine of claim 10 wherein the fan further includes an inlet leading toward the compressor chamber, the compressor chamber and the inlet rotatable with the fan, the compressor chamber leading toward a combustor which generates a high-energy gas stream to drive the turbine, the axial compressor rotor compressing core airflow leading to the inlet, the plurality of compressor blades including a final stage of compressor blades immediately adjacent the inlet with no intervening compressor vanes between the final state of compressor blades and the inlet.

12. The turbine engine of claim 8 wherein the planetary gearset increases a rate of rotation of the axial compressor rotor above a rate of rotation of the fan.

13. The turbine engine of claim 1, wherein the gear is aft of the fan and the turbine.

14. The turbine engine of claim 1, further comprising a combustor radially outward of the fan blades, the combustor configured to provide high energy gas stream to the plurality of turbine blades.

15. The turbine engine of claim 14, wherein a core airflow passage moves air flow through the fan blades into the combustor.

\* \* \* \* \*